United States Patent Office 3,117,464
Patented Jan. 14, 1964

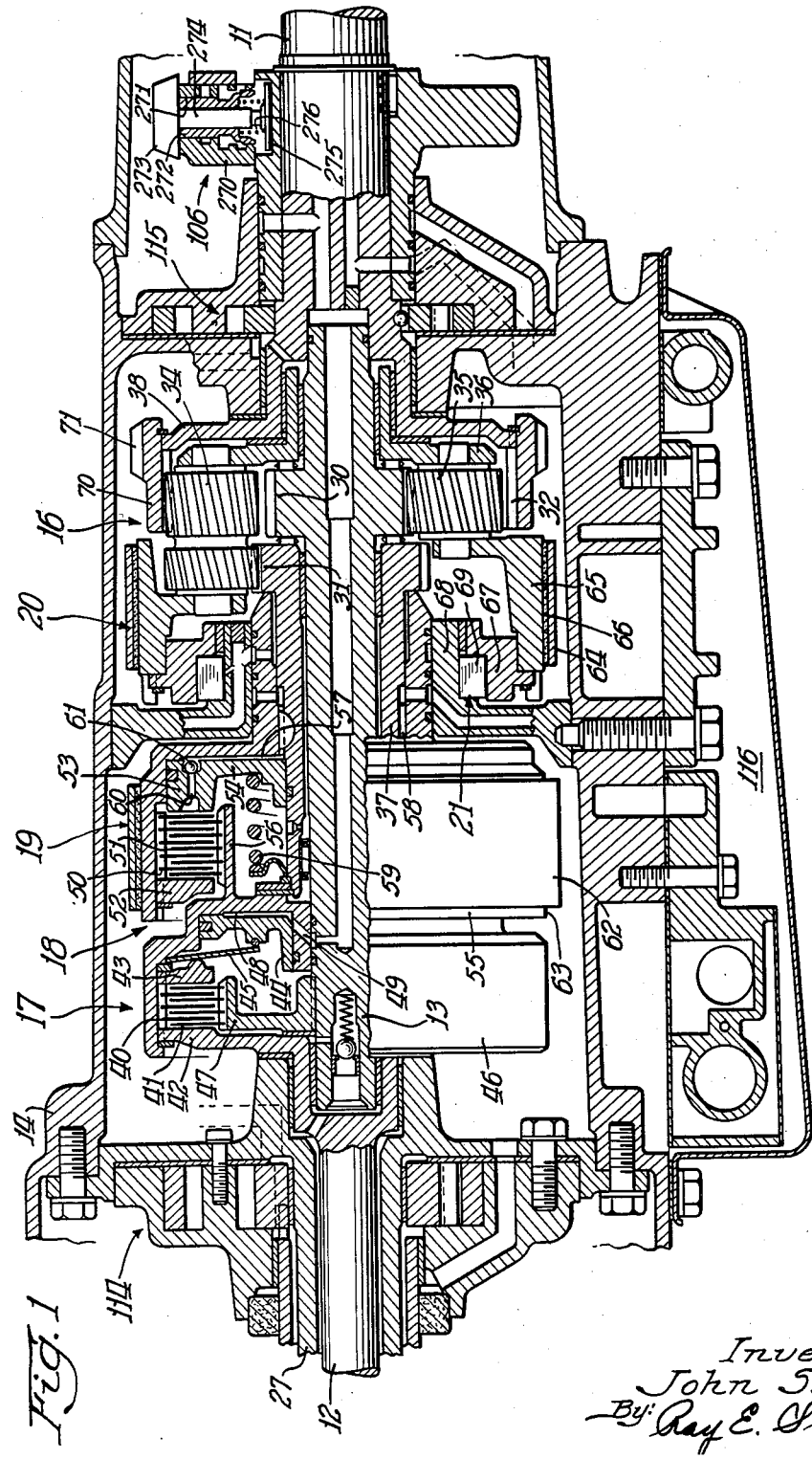

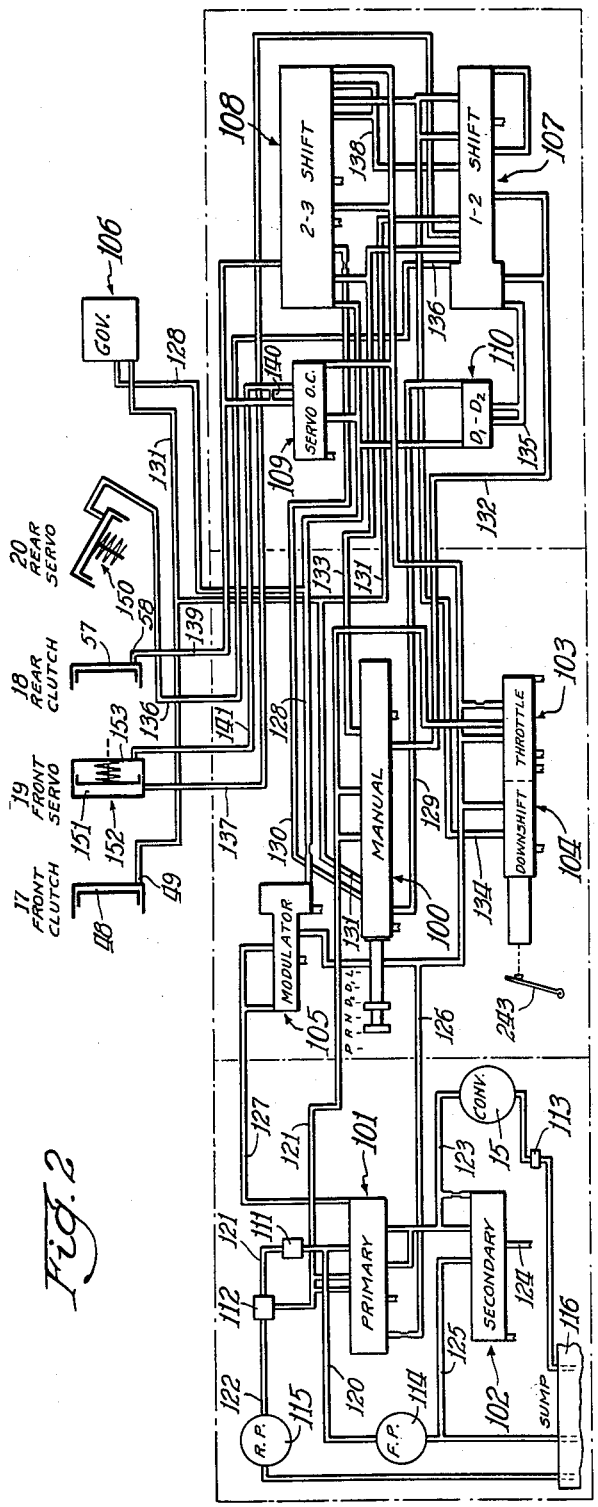

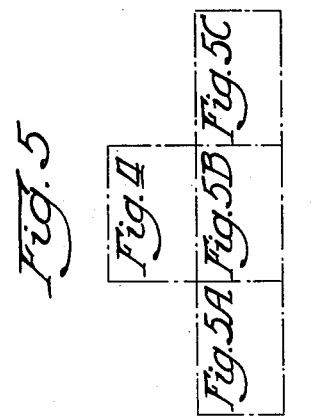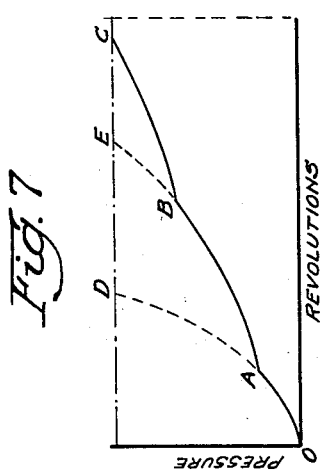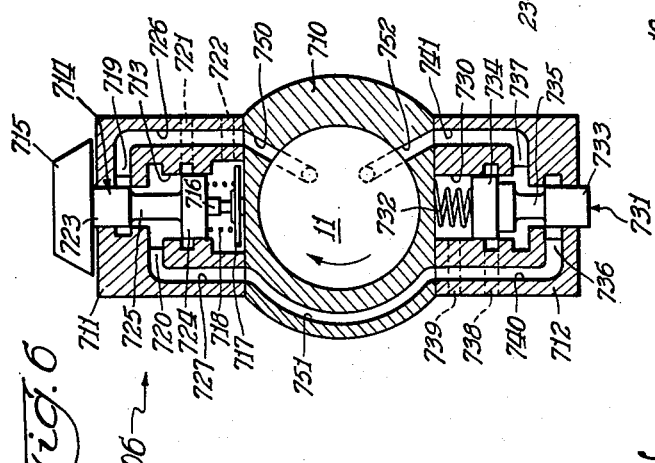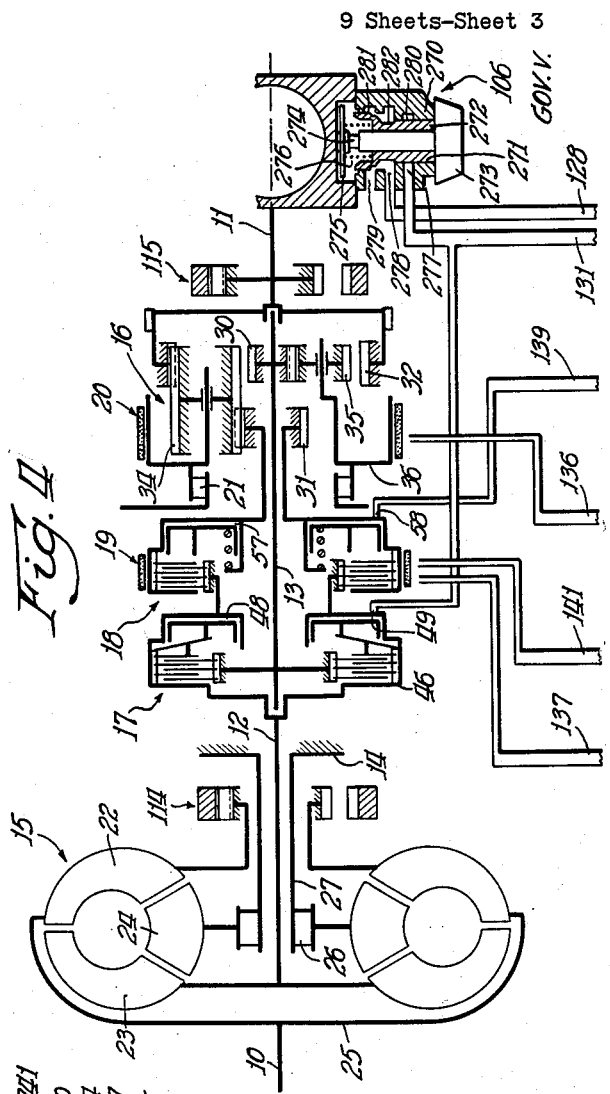

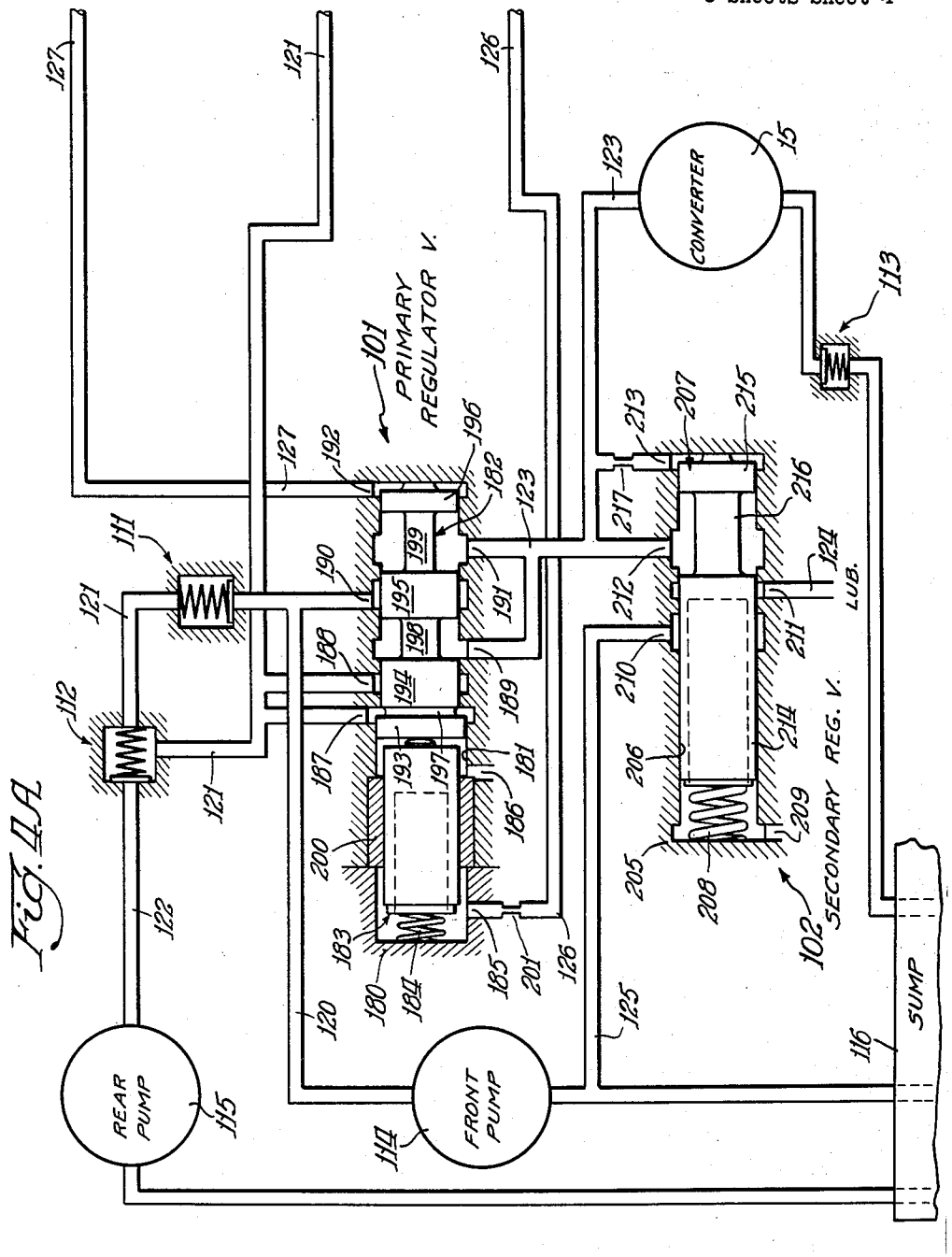

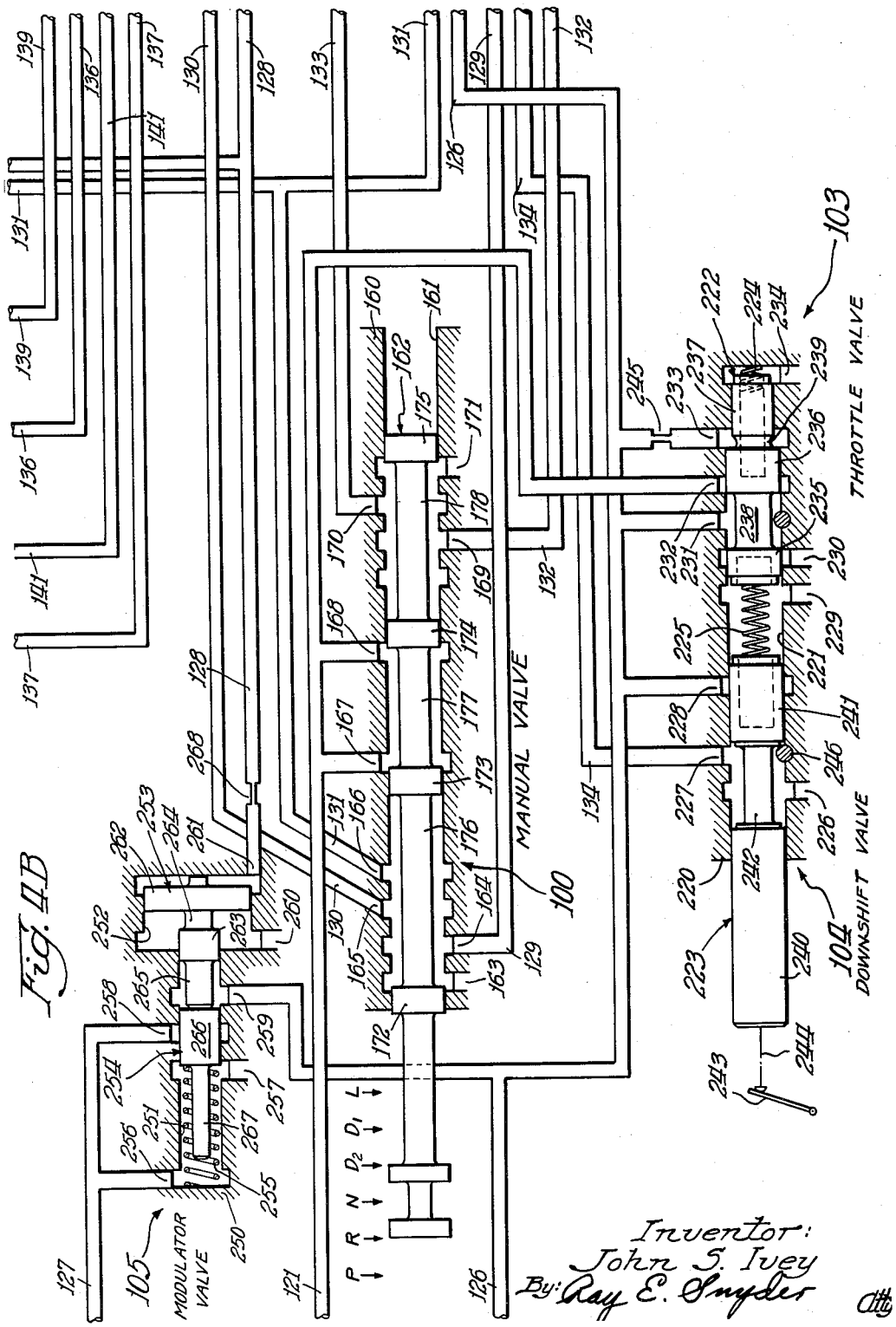

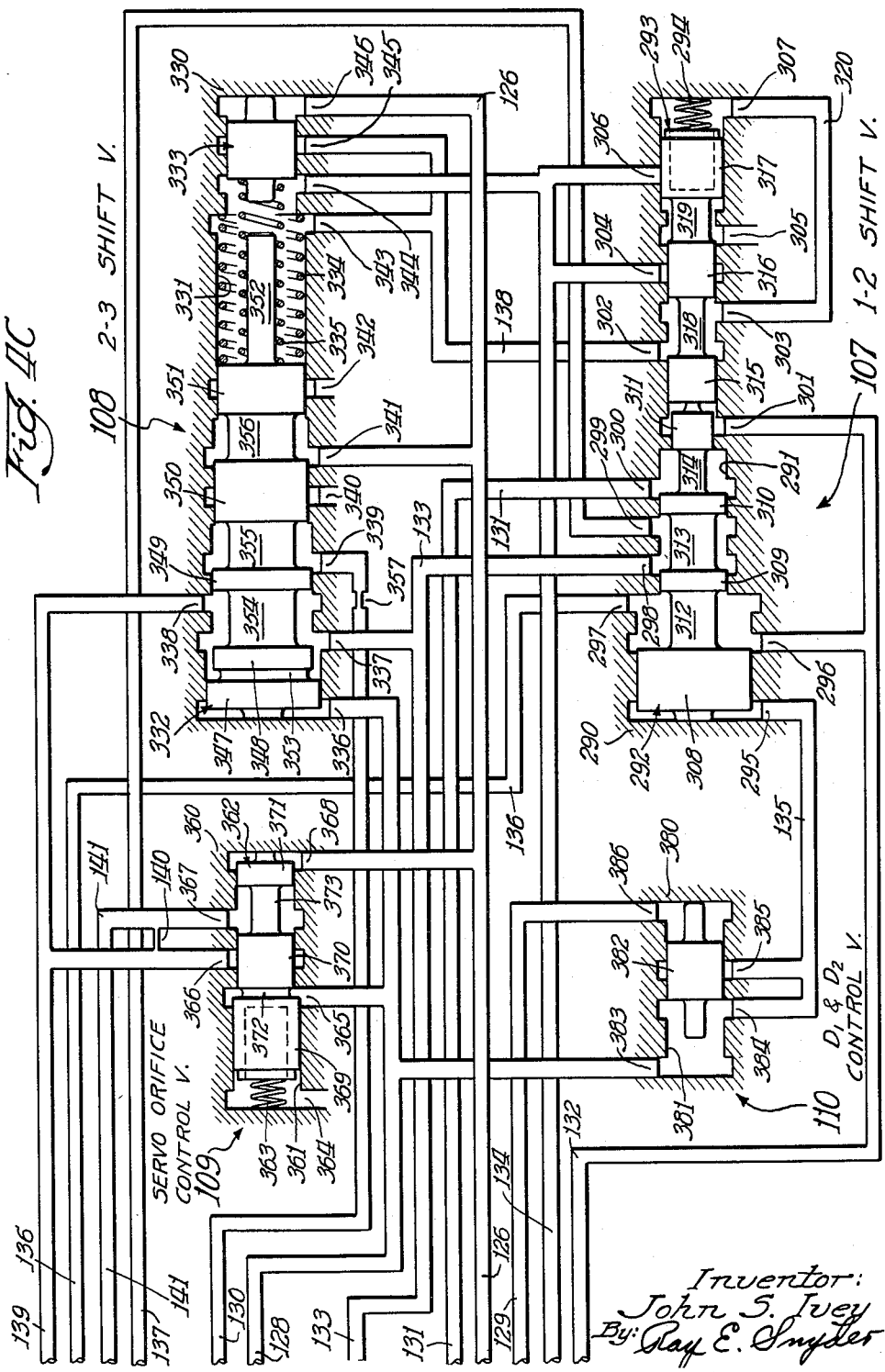

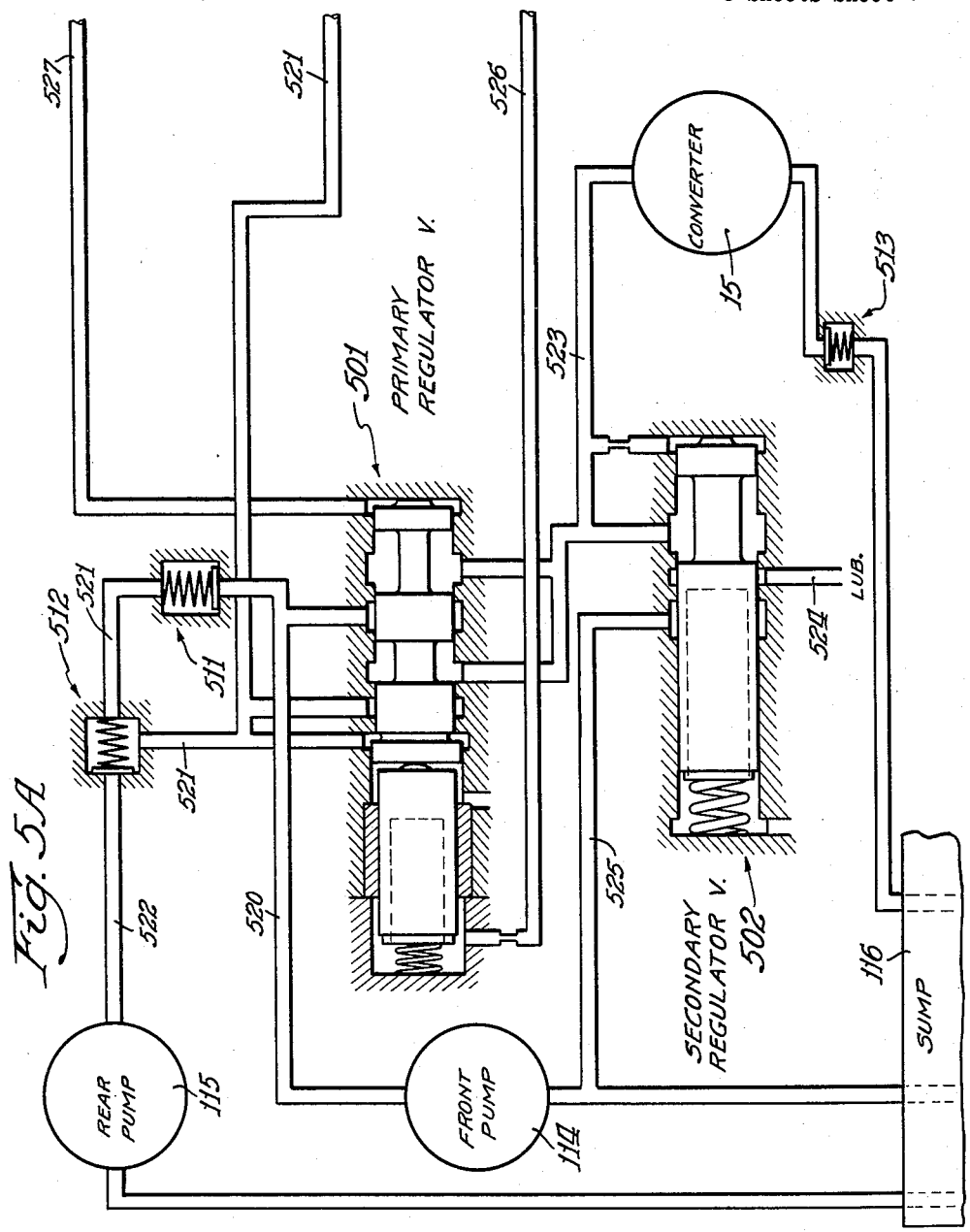

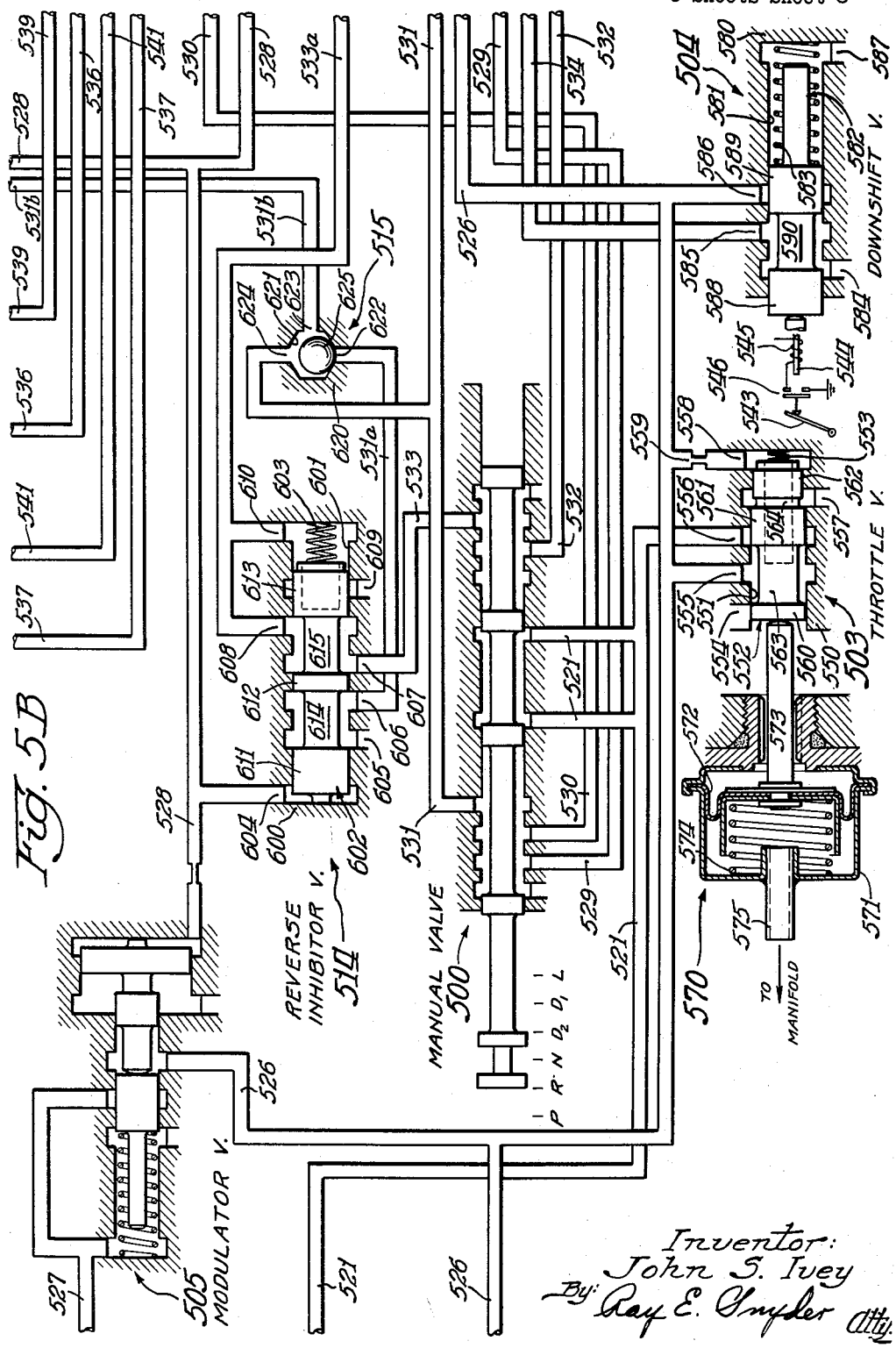

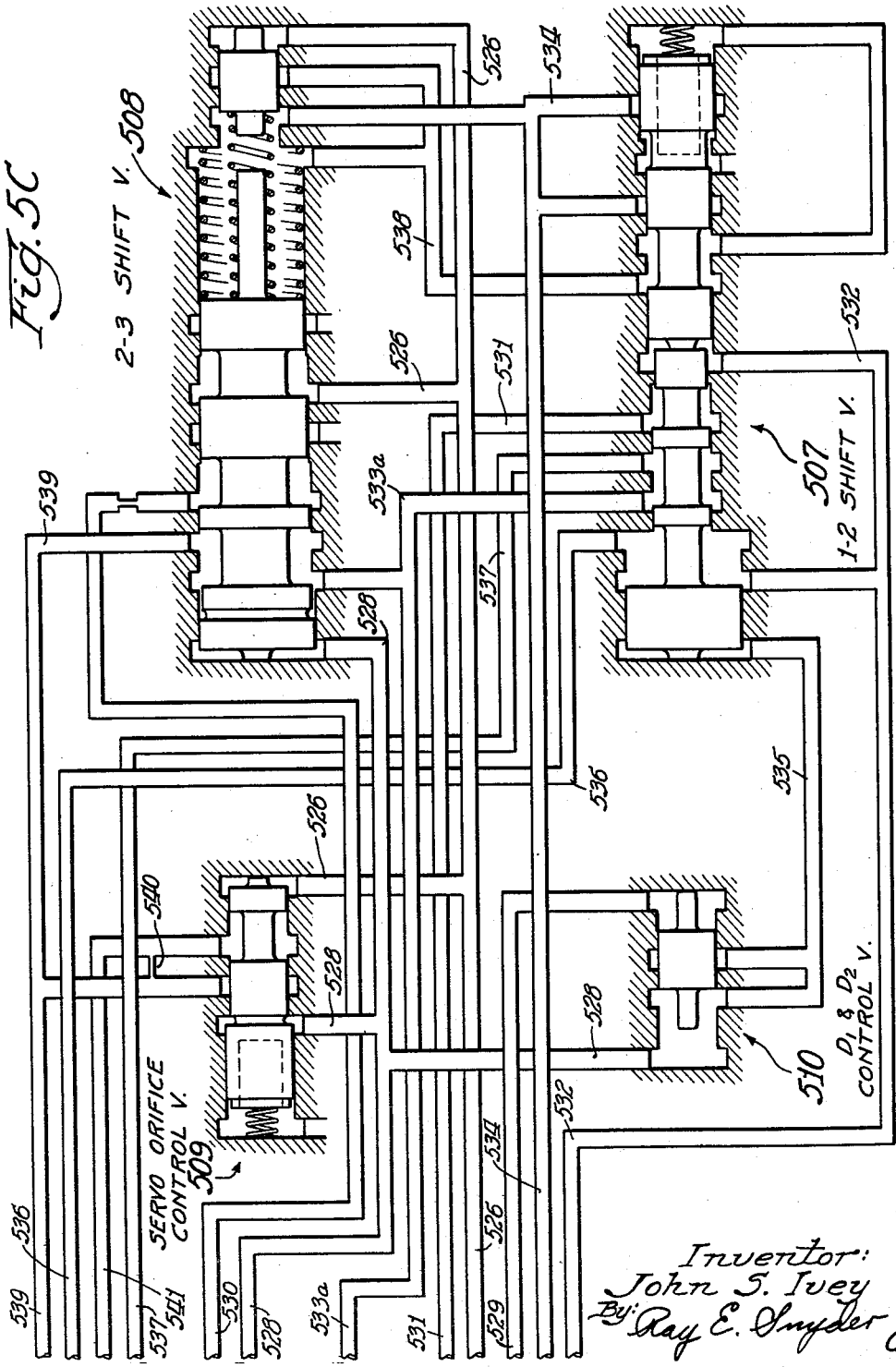

3,117,464
TRANSMISSION CONTROLS
John S. Ivey, Muncie, Ind., assignor to Borg-Warner Corporation, Chicago, Ill., a corporation of Illinois
Filed Mar. 4, 1960, Ser. No. 12,771
10 Claims. (Cl. 74—472)

This invention relates to an automatic transmission control system for use in an automotive vehicle.

The control system for an automatic transmission ordinarily comprises one or more fluid pumps and a plurality of valves for controlling the flow of fluid to pressure actuated clutches or brakes for establishing the various driving gear ratios of the transmission. The valves employed in the control mechanisms must be able to control fluid pressure precisely and be sensitive enough to respond to small differences in pressure over a wide range. To meet these requirements, the valves and springs employed must be manufactured to very close tolerances.

As a particular example, the control of operating or line pressure requires precise pressure regulation for various operating conditions. It is desirable to regulate line pressure at a fairly high value for starting the vehicle, or under conditions of heavy load; whereas, under high speed or light loads, line pressure should be comparatively low so that engagement and disengagement of the various clutches and brakes can be effected with a minimum of lurch or shock.

In the improved control mechanism of the present invention, I provide improved means for regulating the line pressure as a function of throttle position and road speed. More particularly, it is an object to provide a primary regulator valve for regulating line pressure as a function of throttle position and a modulator valve that provides a modulated throttle pressure for also controlling the regulator valve over a limited range of operation, and means responsive to the speed of the vehicle for rendering the modulator valve inoperative above a predetermined speed and thereafter regulating the regulator valve purely as a function of throttle position.

It is an additional object to provide an improved hydraulic control system for an automatic transmission in which there is provided a pump for developing fluid pressure, a pressure regulating valve for regulating the output pressure of the pump, a throttle-responsive valve for providing a fluid pressure in response to throttle pressure, a modulator valve for modifying the pressure supplied from the throttle-responsive valve and effective to apply a modulated pressure to the pressure regulating valve for regulating the output pressure at a relatively high value for initially starting the vehicle.

The improved controls also include means responsive to the speed of the vehicle for negating the effect of the modulator valve and thereafter controlling the regulator valve solely by the output pressure of said throttle-responsive valve for thereby regulating the fluid pressure at a substantially lower value for high vehicle speeds.

It is also an object of the present invention to provide means for controlling the engaging time of a fluid servomotor in shifting from one speed ratio to another, said means including a flow restriction and a control valve operable to bypass said restriction in response to throttle position and in response to vehicle speed.

It is also an object to provide an improved governor valve that is operable to extend the operating range of governor pressure to substantially higher engine speeds than heretofore been obtainable.

The invention consists of the novel constructions, arrangements and devices to be hereinafter described and claimed for carrying out the above-stated objects and such other objects as will appear from the following description of a preferred form of the invention, illustrated with reference to the accompanying drawings, wherein:

FIG. 1 is a longitudinal sectional view of a transmission mechanism with which the improved controls of the present invention are intended to be used;

FIG. 2 is a schematic diagram of the complete control system for the transmission mechanism;

FIG. 3 is a reference layout diagram for combining FIGS. 4, 4A, 4B, and 4C;

FIGS. 4–4C present a more detailed description of the control system of FIG. 2;

FIG. 5 is a reference layout diagram for combining FIGS. 5A, 5B, and 5C with FIG. 4;

FIGS. 5A–5C illustrate a modified version of the control system of the present invention;

FIG. 6 is a cross sectional diagram of an improved governor valve adapted to be used with the control system; and FIG. 7 is a graph illustrating the output pressure provided by the governor valve of FIG. 6 as a function of speed of revolution.

Like characters of reference designate like parts in the several views.

Referring to FIGS. 1, 2, and 4, a transmission mechanism with which the improved controls of the present invention are intended to be used is shown and comprises a drive shaft 10, a driven shaft 11, a first intermediate shaft 12, and a second intermediate shaft 13, all of said shafts being coaxially aligned and rotatably disposed within a transmission casing 14. The transmission mechanism also comprises a torque converter 15, a planetary gear set 16, a front clutch 17, a rear clutch 18, a front brake 19, a rear brake 20, and a oneway brake 21, also disposed within the casing 14.

The torque converter 15 comprises a bladed driving element or impeller 22, a bladed driven element or turbine 23 and a bladed reactor member or stator 24. The impeller 22 is connected by means of a shroud 25 to the drive shaft 10; the turbine 23 is splined to the intermediate shaft 12, and the stator 24 is connected through a one-way brake 26 to a sleeve shaft 27 which is anchored to the transmission casing 14. The torque converter 15 is conventional in structure and operation and will not be further described.

The planetary gear set 16 comprises a first sun gear 30, a second sun gear 31, a ring gear 32, a plurality of long planet gears 34, a plurality of short planet gears 35, and a planet gear carrier 36. The first sun gear 30 is formed integrally with the intermediate shaft 13, the second sun gear 31 is formed integrally on a sleeve shaft 37 journaled on the intermediate shaft 13; and the ring gear 32 is splined to a flared portion 38 of the driven shaft 11. The long planet gears 34 are in mesh with the sun gear 31 and ring gear 32, and the short planet gears 35 are in mesh with the sun gear 30 and with the long planet gears 34. Both of the sun gears 30 and 31 are adapted to be driven by the first intermediate shaft 12. The sun gear 30 is driven by the shaft 12 when the clutch 17 is engaged, and the sun gear 31 is driven by the shaft 12 when the clutch 18 is engaged.

The front clutch 17 comprises clutch disks 40 and 41, pressure plates 42 and 43, a piston 44, and a Belleville washer 45 all disposed within an annular shell 46. The clutch disks 40 are splined within the shell 46, and the clutch disks 41 are splined to the exterior of an annular hub 47 which, in turn, is splined to the intermediate shaft 13. The pressure plate 42 is formed integrally with the first intermediate shaft 12, and the pressure plate 43 is splined within the interior of the shell 46. The piston 44 is slidably disposed within an annular cavity 48 formed in the shell 46 and is adapted to engage the clutch 17 when fluid under pressure is supplied to the cavity 48 through a port 49. The Belleville washer 45 functions as a lever between the piston 44 and the pressure plate 43 for pressing the disks 40 and 41 into engagement. The Belleville washer 45 also functions as a spring for returning the piston 44 when fluid pressure is released from the cavity 48.

The rear clutch 18 comprises a plurality of clutch disks 50 and 51, pressure plates 52 and 53, and a piston 54. The clutch disks 50 are splined to the interior of an annular shell 55 which is keyed to the sleeve shaft 37, and the clutch disks 51 are splined to the exterior of an annular flange 56 formed integrally with the shell 46. The pressure plate 52 is splined to the interior of the shell 55, and the pressure plate 53 is formed integrally with the piston 54. The piston 54 is slidably disposed within an annular cavity 57 in the shell 55. Fluid pressure is supplied to the cavity 57 through a port 58 for moving the piston 54 and pressing the clutch disks 50 and 51 into engagement. A release spring 59 is provided for returning the piston 54 when fluid pressure is released from the cavity 57. The piston 54 is formed with a fluid bleed port 60 and a centrifugally actuated ball check valve 61 for preventing the application of the clutch 18 due to centrifugal force acting on entrapped fluid within the cavity 57. When pressure is applied through the port 58, the valve 61 blocks the bleed port 60.

The front brake 19 comprises an annular brake band 62 adapted to frictionally engage a cylindrical surface 63 on the exterior of the shell 55.

The rear brake 20 comprises a brake band 64, and a brake drum 65 formed integrally with the planet gear carrier 36 of the gear set 16. The brake band 64 is adapted to frictionally engage an outer cylindrical surface 66 of the drum 65.

The one-way brake 21 comprises an outer race 67, an inner race 68, and a plurality of tiltable sprags 69 disposed between the races. The outer race 67 is fixedly attached to the planet gear carrier 36, and the inner race 68 is anchored to the transmission casing 14.

The ring gear 32 of the planetary gear set 16 is formed on the interior of an annular member 70 which is splined to the annular portion 38 of the driven shaft 11. The annular member 70 is also formed with a plurality of external teeth 71 comprising part of a parking brake (not shown). A pawl (not shown) is adapted to engage the teeth 71 for locking the driven shaft 11 with respect to the transmission casing 14.

The illustrated transmission provides low, intermediate, and high speed forward drives and a reverse drive. When both clutches 17 and 18 and brakes 19, 20 and 21 are disengaged, the transmission is in neutral and no driving torque is transmitted from the drive shaft 10 to the driven shaft 11.

Low speed forward drive for starting the vehicle is obtained by engaging the front clutch 17 and the one-way brake 21, the clutch 18 and brakes 19 and 20 remain disengaged. The engaged clutch 17 completes a driving connection between the first intermediate shaft 12 and the second intermediate shaft 13. The engaged one-way brake 21 holds the planet gear carrier 36 stationary so that it functions as a reaction member for the gear set 16. In this condition, driving torque supplied by an engine (not shown) is transmitted from the drive shaft 10 through the torque converter 15, first intermediate shaft 12, clutch 17, second intermediate shaft 17, sun gear 30, planet gears 35 and 34, and the ring gear 32 to the driven shaft 11. The driven shaft 11 is connected to the driving road wheels of the vehicle through any suitable means (not shown).

A second speed or intermediate speed forward drive is subsequently obtained by engaging the brake 19. The engaged brake 19 functions to hold stationary the front sun gear 31 which, in turn, acts as a reaction member for the gear set 16, and the one-way brake 21 unlocks and overruns. In this condition, driving torque is transmitted from the drive shaft 10 to the sun gear 30 as previously described for low speed drive, but with the front sun gear 31 acting as the reaction member, the planet gears 34 drive the ring gear 32 and driven shaft 11 at a higher speed ratio than for low speed forward drive.

High speed forward drive is subsequently obtained by disengaging the brake 19 and engaging the clutch 18, the one-way brake 21 continues to overrun. The engaged clutches 17 and 18 effectively lock together the sun gears 30 and 31 thereby locking up the planetary gear set 16 so that a 1:1 direct drive is obtained between the first intermediate shaft 12 and the driven shaft 11.

A drive in reverse is completed by engaging the clutch 18 and brake 20. In this condition, driving torque is transmitted from the drive shaft 10 through the torque converter 15, intermediate shaft 12, shell 46, clutch 18, sun gear 31, planet gears 34, and ring gear 32 to the driven shaft 11. The brake 20 holds the planet gear carrier 36 stationary so that it functions as a reaction member and forward driving torque supplied to the sun gear 31 is reversed by the planetary gear set 16 so that the ring gear 32 and driven shaft 11 are driven in the reverse direction.

An alternate low speed forward drive is obtained for hill-braking or when desired by engagement of the front clutch 17 and the rear brake 20. In this condition the brake 20 holds the planet gear carrier 36 stationary so that it functions as the reaction member for the gear set 16 and low speed forward drive is obtained in the same manner as when the one-way brake 21 holds the carrier 36 stationary.

The various driving gear ratios are summarized and tabulated below for ready reference.

| Speed Ratio | Front Clutch 17 | Rear Clutch 18 | Front Brake 19 | Rear Brake 20 | One-way Brake 21 | Gear Ratio |
|---|---|---|---|---|---|---|
| Low | X | | | | X | 2.44 |
| Intermediate | X | | X | | | 1.48 |
| High | X | X | | | | 1.00 |
| Reverse | | X | | X | | 2.00 |
| Alternate Low | X | | | X | | 2.44 |

The improved control system for the transmission mechanism of FIG. 1 is shown in FIG. 2 and comprises the following valves:

100 Manual valve
101 Primary regulator valve
102 Secondary regulator valve
103 Throttle valve
104 Downshift valve
105 Modulator valve
106 Governor valve
107 1-2 shift valve
108 2-3 shift valve
109 Servo orifice control valve
110 D1-D2 control valve
111 Front pump check valve
112 Rear pump check valve
113 Converter relief check valve.

In addition to the above list of valves, the hydraulic control system also comprises an engine driven front pump 114 and a rear pump 115 adapted to be driven by the driven shaft 11. Fluid for supplying the converter 15 and the control system is contained within a sump 116.

The front pump 114 is connected by means of a conduit 120 to the primary regulator valve 101 and the front pump check valve 111. The front pump check valve 111 is connected by means of a conduit 121 to the rear pump check valve 112, the primary main regulator valve 101, the manual valve 100, and the throttle valve 103. The rear pump 115 is connected by means of a conduit 122 to the rear pump check valve 112.

The primary regulator valve 101 is also connected by means of a conduit 123 to the converter 15, and to the secondary regulator valve 102. The secondary regulator valve 102 is also connected to a conduit 124 for supplying lubricating fluid to the transmission mechanism, and through a conduit 125 to the suction line for the front pump 114.

The throttle valve 103 is connected by means of a conduit 126 to the primary regulator valve 101, the modulator valve 105, the downshift valve 104, the 2–3 shift valve 108, the servo orifice control valve 109. The modulator valve 105 is also connected by means of a conduit 127 to the primary regulator valve 101 and by means of a conduit 128 to the governor valve 106. The conduit 128 from the governor valve 106 is also connected to the 2–3 shift valve 108, the servo orifice control valve 109 and the D1–D2 control valve 110.

The manual valve 100 is connected by means of a conduit 129 to the D1–D2 control valve 110; by means of a conduit 130 to the 2–3 shift valve 108; by means of a conduit 131 to the 1–2 shift valve 107, to the governor valve 106, and to the clutch apply cavity 48 of the front clutch 17. The manual valve 100 is also connected by means of a conduit 132 to the 1–2 shift valve 107; and by means of a conduit 133 to the 1–2 shift valve 107 and the 2–3 shift valve 108.

The downshift valve 104 is connected by means of a conduit 134 to the 1–2 shift valve 107 and to the 2–3 shift valve 108. The 1–2 shift valve 107 is also connected by means of a conduit 135 to the D1–D2 control valve 110; by means of a conduit 136 to a servomotor 150 for applying the rear brake 20. The 1–2 shift valve 107 is also connected by means of a conduit 137 to the apply cavity 151 of a servomotor 152 for applying the front brake 19. The 1–2 shift valve 107 is also connected by means of a conduit 138 to the 2–3 shift valve 108.

The 2–3 shift valve 108 is connected by means of a conduit 139 to the servo orifice control valve 109 and to the clutch apply cavity 57 of the rear clutch 18. The conduit 139 is also connected through a restriction 140 to a conduit 141 which is connected to the servo orifice control valve 109 and to a servo release cavity 153 of the servomotor 152.

The manual valve 100 is used to select the various driving conditions and comprises a casing 160 formed with a longitudinal cylindrical bore 161 and a valve piston 162 slidably disposed within the bore 161. The casing 160 is formed with ports 163, 164, 165, 166, 167, 168, 169, 170, and 171 all opening into the bore 161. The piston 162 is formed with lands 172, 173, 174, and 175 and annular grooves 176, 177 and 178 between the lands. The port 164 is connected to the conduit 129; the port 165 is connected to the conduit 130; the port 166 is connected to the conduit 131; ports 167 and 168 are connected to the conduit 121; port 169 is connected to the conduit 132; port 170 is connected to the conduit 133; and ports 163 and 171 are drain ports opening into the sump 116 for the transmission.

The piston 162 is adapted to be moved longitudinally into any one of six selective positions for communicating various of the ports within the casing 160 with various other ports. The six selective positions are as follows: P for parking position, R for reverse drive, N for neutral, D2 for forward driving range starting in intermediate, D1 for forward driving range starting in low, and L for driving in manual low speed forward drive.

The primary regulator valve 101 functions to regulate the pressure developed by the pumps 114 and 115 and comprises a casing 180 formed with a stepped longitudinal cylindrical bore 181, a valve piston 182, a valve plug 183, and a valve spring 184 all disposed within the bore 181. The casing 180 is formed with ports 185, 186, 187, 188, 189, 190, 191, and 192 all opening into the bore 181. The valve piston 182 is formed with lands 193, 194, 195, and 196. The lands 194, 195, and 196 are of the same diameter, and the land 193 is of a slightly larger diameter. The piston 182 is also formed with annular grooves 197, 198, and 199 between the lands. The valve plug 183 is of a slightly larger diameter than the lands 194–196 and is piloted within a sleeve 200. The port 185 is connected through a restriction 201 to the conduit 126; the ports 187 and 188 are connected to the conduit 121; the ports 189 and 191 are connected to the conduit 123; the port 190 is connected to the conduit 120; the port 192 is connected to the conduit 127; and port 186 is open to the sump 116.

The secondary regulator valve 102 functions to regulate converter pressure and comprises a casing 205 formed with a longitudinal cylindrical bore 206, a valve piston 207 and a valve spring 208. The casing 205 is formed with ports 209, 210, 211, 212, and 213 all opening into the bore 206. The valve piston 207 is formed with lands 214 and 215 and an annular groove 216 between the lands. The port 210 is connected to the conduit 125; the port 211 is connected to the lubrication conduit 124; the port 212 is connected to conduit 123; the port 213 is also connected through a restriction 217 to the conduit 123; and the port 209 is a bleed port open to the sump 116.

The throttle valve 103 and the downshift valve 104 comprise a casing 220 formed with a stepped longitudinal cylindrical bore 221, a throttle valve piston 222, a downshift valve piston 223, a spring 224 acting against the piston 222, and a spring 225 disposed between the pistons 222 and 223. The casing 220 is formed with ports 226, 227, 228, 229, 230, 231, 232, 233, and 234, all opening into the bore 221.

The throttle valve piston 222 is formed with lands 235 and 236 of the same diameter and a land 237 of smaller diameter, and with annular grooves 238 and 239 between the lands.

The downshift valve piston 223 is formed with lands 240 and 241, and an annular groove 242 between the lands. The downshift valve piston 223 is adapted to be moved longitudinally under the influence of an accelerator pedal or throttle actuator 243 acting through a suitable linkage 244. A pin or stop 246 limits the motion of the downshift valve piston 223 to the right or left.

The port 227 is connected to the conduit 134; the ports 228 and 231 are connected to the conduit 126; the port 232 is connected to the conduit 121; the port 233 is connected through a restriction 245 to the conducit 126; and ports 226, 229, 230, and 234 are bleed ports open to the sump 116.

The modulator valve 105 comprises a casing 250 formed with two interconnected bores 251 and 252, a valve piston 253 slidably disposed within the bore 252, a valve plug 254 slidably disposed within the bore 251, and a spring 255 acting against the valve plug 254. The casing 250 is formed with ports 256, 257, 258, and 259 opening to the bore 251 and ports 260 and 261 opening into the bore 252. The valve piston 253 is formed with a land 262 of large diameter within the bore 252 and a land 263 of small diameter extending into the bore 251. The valve piston 253 is also formed with an annular groove 264 between the lands, and an extension 265 which abuts against the valve plug 254. The valve plug 254 comprises a land 266 and an extension 267 of reduced diameter. The ports 256 and 258 are connected to the conduit 127; the port 259 is connected to the conduit 126; the port 261 is connected through a restriction 268 to the conduit 128; and the ports 257 and 260 are bleed ports open to the sump 116.

The governor valve 106 comprises a casing 270 formed with a radial cylindrical bore 271 and mounted to rotate with the driven shaft 11. The valve 106 also comprises a valve sleeve 272 slidably disposed within the bore 271, a centrifugal weight 273, a stem 274 attached to the weight 273 and piloted within the valve sleeve 272, a spring retaining cap 275 attached to an inner end of the stem 274, and a valve spring 276. The casing 270 is also formed with ports 277, 278, and 279 all opening into the bore 271. The valve sleeve 272 is formed with lands 280 and 281, and an annular groove 282 between the lands. The land 281 is of a slightly larger diameter than the land 280. The port 277 is connected to the conduit 131; the port 278 is connected to the conduit 128; and the port 279 is a bleed port open to the sump 116.

The 1-2 shift valve 107 comprises a casing 290 formed with a stepped longitudinal cylindrical bore 291, valve pistons 292 and 293 slidably disposed within the bore 291, and a valve spring 294. The casing 290 is formed with ports 295, 296, 297, 298, 299, 300, 301, 302, 303, 304, 305, 306, and 307, all opening into the bore 291. The valve piston 292 is formed with lands 308, 309, 310, and 311, and annular grooves 312, 313, and 314 between the lands. The land 308 is substantially larger than the lands 309 and 310 which are of the same size, and the land 311 is slightly smaller than the lands 309 and 310. The valve piston 293 is formed with lands 315, 316, and 317, and annular grooves 318 and 319 between the lands. The lands 315 and 316 are of the same diameter and the land 317 is of a slightly larger diameter. The port 295 is connected to the conduit 135; the ports 296 and 301 are connected to the conduit 132; the port 297 is connected to the conduit 136; the port 298 is connected to the conduit 133; the port 299 is connected to the conduit 137; the port 300 is connected to the conduit 131; the port 302 is connected to the conduit 138; the ports 304 and 306 are connected to the conduit 134; ports 303 and 307 are interconnected through a channel 320; and port 305 is a bleed port open to the sump 116.

The 2-3 shift valve 108 comprises a casing 330 formed with a stepped longitudinal cylindrical bore 331, a valve piston 332 slidably disposed within the bore 331, a valve plug 333, and springs 334 and 335. The casing 330 is formed with ports 336, 337, 338, 340, 341, 342, 343, 344, 345, and 346 all opening into the bore 331. The valve piston 332 is formed with a land 347 of a relatively large diameter, lands 348 and 349 of equal diameter and lands 350 and 351 of successively smaller diameters, and an extension 352 of reduced diameter. The valve piston 332 is also formed with annular grooves 353, 354, 355, and 356 between the lands. The port 336 is connected to the conduit 128; the port 337 is connected to the conduit 133; the port 338 is connected to the conduit 139; the port 339 is connected through a restriction 357 to the conduit 130; the ports 341 and 346 are connected to the conduit 126; the ports 343 and 345 are connected to the conduit 138; the port 344 is connected to the conduit 134; and ports 340 and 342 are bleed ports open to the sump 116.

The servo orifice control valve 109 comprises a casing 360 formed with a stepped longitudinal cylindrical bore 361, a valve piston 362 slidably disposed within the bore 361, and a valve spring 363. The casing is formed with ports 364, 365, 366, 367, and 368 all opening into the bore 361. The valve piston 362 is formed with a relatively large land 369, lands 370 and 371 of equal diameter, and annular grooves 372 and 373 between the lands. The port 365 is connected to the conduit 128; port 366 is connected to the conduit 139; port 367 is connected to the conduit 141; port 368 is connected to the conduit 126; and port 364 is a bleed port open to the sump 116.

The D1-D2 control valve 110 comprises a casing 380 formed with a cylindrical bore 381, and a valve plug 382 slidably disposed within the bore 381. The casing 380 is formed with ports 383, 384, 385, and 386 all opening into the bore 381. The port 383 is connected to the conduit 128; port 386 is connected to the conduit 129; and ports 384 and 385 are connected to the conduit 135.

In operation, the control system for the transmission functions as follows. The manual selector valve 100 is set in the Neutral or Park position for starting the vehicle. With the engine running in the Neutral or Park positions, fluid is drawn from the sump 116 by the front pump 114 and is delivered through conduit 120 and the front pump check valve 111 into conduit 121 to the ports 187 and 188 of the regulator valve 101 and to the ports 167 and 168 of the manual selector valve 100, and to the port 232 of the throttle valve 103.

The primary regulator valve piston 182 is moved to the left against the action of the spring 184 by a total force developed due to fluid pressure acting on the differential area between lands 193 and 194. Movement of the valve piston 182 to the left, as shown, opens the port 190 and permits fluid to flow through the groove 199 to port 191 into conduit 123 and to port 212 of the secondary regulator valve 102. When the port 190 is opened by the land 195, the pressure in conduits 120 and 121 is reduced until the force of the spring 184 is balanced by the force due to fluid pressure acting on the differential area of lands 193 and 194. The regulator valve 101 thereby functions to regulate the pressure in conduit 121, hereinafter referred to as the line pressure conduit.

Fluid is also supplied through the conduit 123 to the converter 15. Fluid pressure within the conduit 123 is also applied through the restriction 217 to the right-hand end of the land 215 of the secondary regulator valve piston 207. The pressure acting against the land 215 forces the piston 207 toward the left, as shown, against the action of the spring 208. As the piston 207 moves to the left, port 211 is opened and fluid is permitted to pass from the port 212 through the groove 216 and out through the port 211 and conduit 124 for lubricating the rotating parts of the transmission.

Release of fluid through the port 211 causes the pressure within conduit 123 to drop until the force developed by the spring 208 is exactly balanced by the pressure acting against the land 215. The secondary regulator valve thereafter regulates the fluid pressure applied to the conduit 123 at a maximum value of approximately 40 p.s.i. If the pressure in the conduit 123 rises sufficiently high, the valve piston 207 is moved further toward the left so as to open the port 210 and permit drainage of fluid from the port 212 through the groove 216 and out through the port 210 into conduit 125.

The converter check valve 113 is biased to open at a pressure of approximately 8-10 p.s.i. and functions to inhibit drainage of the fluid within the converter 15 into the sump 116.

A forward drive power train through the transmission is conditioned by shifting the manual selector valve 100 into the D1 position. In the D1 position, fluid under pressure in the conduit 121 is permitted to flow through the port 167 and the groove 176 to the ports 165 and 166. Fluid passes through the port 165 into the conduit 130 and to the 2-3 shift valve 108 through the restriction 357 and through the port 339 into the groove 355 between the lands 349 and 350 of the shift valve piston 332. The passage of fluid is blocked at this point until the valve piston 332 is moved to an upshifted position.

Fluid flowing through the port 166 and conduit 131 is supplied to the clutch apply cavity 48 of the front clutch 17, to the port 277 of the governor valve 106 and to the port 300 into the groove 314 between lands 310 and 311 of the 1-2 shift valve piston 292. Fluid is blocked at the lattermost point until the 1-2 shift valve is moved to an upshifted position.

Engagement of the front clutch 17 and of the one-way brake 21 conditions the transmission for low speed forward drive as previously described. The vehicle is set into motion by depressing the accelerator pedal 243 for increasing the driving torque supplied to the torque converter 15 for driving the transmission and the output shaft 11. Depression of the throttle pedal 243 moves the downshift valve piston 223 to the right against the action of the spring 225 which, in turn, forces the throttle valve piston 222 to the right opening the port 232. Fluid is permitted to pass from the port 232 through the groove 238 and port 231 into the conduit 126. Fluid in the conduit 126 is directed through the restriction 245 and port 233 to the groove 239 between lands 236 and 237. Since the land 236 is larger than the land 237 there is a net force developed by the fluid pressure due to the differential area tending to close the port 232. The throttle valve 103 thereby provides a regulated pressure in the conduit 126 that is a function of throttle position and will hereinafter be designated throttle pressure.

The throtle pressure in the conduit 126 is supplied to the 2–3 shift valve 108 through the port 346 to the right-hand end of the shift valve plug 333, through the port 341 into the groove 356 between lands 350 and 351, and through the port 368 to the right-hand end of the servo orifice control valve piston 362. Throttle pressure in the conduit 126 is also supplied to the left-hand end of the primary regulator valve 101 through the restriction 201 and port 185 where it supplements the action of spring 184 tending to force the regulator valve piston 182 to the right, thereby tending to increase the pressure in the line pressure conduit 121. Throttle pressure is also supplied to the modulator valve 105 through the port 259 into the bore 251 where it acts against the right-hand end of the modulator valve plug 254 tending to force it to the left against the action of the spring 255. If the throttle pressure is sufficiently great, the valve plug 254 is forced to the left so as to open the port 258 and permit the passage of fluid into the conduit 127. Fluid pressure in the conduit 127 is applied through the port 256 back into the bore 251 where it supplements the action of the spring 255 and tends to force the plug 254 to the right, thereby tending to close the port 258. The valve plug 254 thereby provides a regulated output pressure that is less than throttle pressure by a predetermined amount. This output pressure will hereinafter be referred to as modulator pressure and is applied through the port 192 to the right-hand end of the primary regulator valve piston 182. The modulator pressure tends to force the piston 182 to the left against the combined action of the spring 184 and throttle pressure and thereby tends to regulate line pressure in the conduit 121 at a lower value.

As the speed of the vehicle and the output shaft 11 increases, centrifugal force acting on the weight 273 of governor valve 106 is transmitted through the stem 274 and retaining cap 275 and spring 276 to the valve sleeve 272. The valve sleeve 272 is moved outwardly to a position where the port 277 is opened and the port 279 is blocked by land 281 and fluid is permitted to pass from the conduit 131 through the groove 282 and port 278 into the conduit 128. Fluid pressure within the groove 282 acts against both lands 280 and 281. Since the land 281 is larger than the land 280 there is a net force tending to move the valve sleeve inwardly against centrifugal force. The valve 106 thereby regulates the output pressure in line 128 as a function of the speed of rotation of the shaft 11 or vehicle speed. The output pressure in the conduit 128 will hereinafter be referred to as governor pressure.

Governor pressure in the conduit 128 is supplied to the modulator valve 105 through the restriction 268 and port 261 to the right-hand end of valve piston 253. Governor pressure is also applied to the servo orifice control valve 109 through the port 365 into the groove 372 between lands 369 and 370; to the left-hand end of the 2–3 shift valve piston 332 through the port 336; and through the port 383 to the left-hand end of the D1–D2 control valve plug 382. With the manual selector valve 100 in the D1 position, governor pressure forces the valve piston 382 to the right and permits fluid to flow through the port 384, conduit 135 and port 295 into the bore 291 where it acts against the left-hand end of the 1–2 shift valve piston 292.

As the governor pressure increases with vehicle speed, the pressure acting against the right-hand face of the modulator valve piston 253 tends to move it to the left. Throttle pressure acting against the land 263 tends to force the piston 253 to the right. When the force developed by the governor pressure exceeds a force due to throttle pressure, the valve piston 253 is moved to the left and the extension 265 forces the modulator valve plug 254 to the left, thus permitting full throttle pressure to flow into the conduit 127. The primary regulator valve 101 thereafter is regulated directly as a function of throttle pressure rather than modulator pressure.

At some stage of the operation when the speed of the driven shaft 11 increases, the rear pump 115 takes over the function of supplying fluid for the control system. In this condition the rear pump draws fluid from the sump 116 and discharges the fluid through the conduit 122, through the check valve 112 and into the conduit 121. This fluid pressure is also effective to close the front check valve 111. Thereafter, fluid pressure supplied by the rear pump 115 is regulated by the primary regulator valve 101 by the land 194 at its juncture with the port 188, and the output of the front pump 114 is discharged through the port 190 and groove 199 and port 191 into the conduit 123 where it supplies the converter 15 and is regulated by the secondary regulator valve 102.

An upshift from low speed forward drive to intermediate forward speed drive occurs when the governor pressure developed in conduits 128 and 135 is sufficiently great to force the 1–2 shift valve piston 292 to the right. For this shift to occur, the governor pressure must overcome the action of the spring 294 and a shift valve plug pressure applied against the right-hand end of the valve piston 293.

The shift valve plug pressure is obtained in the following manner: Throttle pressure in the conduit 126 is supplied ot the 2–3 shift valve 108 through the port 346 where it acts against the right-hand end of the 2–3 shift valve plug 333. Throttle pressure forces the plug 333 to the left against the action of the spring 335 thereby opening the port 345. Fluid is permitted to flow through the port 345 into the conduit 138 and through the port 343 into hte bore 331 where it supplements the action of the spring 335 tending to force the plug 333 to the right. The shift valve plug 333 thereby provides a regulated pressure that is some predetermined value below throttle pressure. This regulated pressure will hereinafter be referred to as the shift valve plug pressure and is supplied through the port 302 through the groove 318, port 303, channel 320, and port 307 into the right-hand end of the bore 291 where it supplements the action of spring 294 and forces the shift valve piston 293 to the left. Line pressure supplied from the conduit 131 into the groove 314 between lands 310 and 311 also develops a net force due to the differential area between lands 310 and 311 which tends to force the shift valve 292 to the left. This latter pressure as well as the shift valve plug pressure and force of spring 294 must all be overcome before shift to intermediate speed drive can occur.

An upshift to intermediate speed drive does occur at some forward vehicle speed depending upon throttle position. In a substantially closed throttle position, this upshift may occur at a speed of 7–10 m.p.h., whereas under full throttle condition, the upshift may occur at approximately 30–35 m.p.h. When the 1–2 shift valve piston 292 is moved to the right, line pressure in the conduit 131 is permitted to flow through the port 300, the groove 313, port 299, and conduit 137 to the apply cavity 151 of the servo-motor 152 for operating the front brake 19. The front brake 19 is engaged and the one-way brake 21 is permitted to overrun and the transmission is thereby conditioned for intermediate speed drive condition.

Movement of the shift valve pistons 292 and 293 to the right functions to cut off the shift valve plug pressure acting against the right-hand end of the piston 293 and also removes the differential force due to line pressure acting on the lands 310 and 311. This insures that a downshift to low speed forward drive does not occur except at a speed substantially lower than that at which an upshift occurred. Removal of the differential force due to line pressure and shift valve plug pressure also insures rapid movement of the shift valve pistons 292 and 293 either up or down once the governor pressure has reached a value at which a shift can occur.

As governor pressure increases further with vehicle speed, the force due to governor pressure acting against the left-hand face of the 2–3 shift valve piston 332 becomes sufficient to overcome the combined forces due to line pressure acting on the differential areas of lands 349 and 350, throttle pressure acting on the differential areas of lands 350 and 351, shift valve plug pressure acting against the right-hand end of the valve 332, and the force due to springs 334 and 335. When the shift valve piston 332 is moved to the right, line pressure at the port 339 is permitted to flow through the groove 354, the port 338, the conduit 139, and the port 58 into the clutch apply chamber 57 of the rear clutch 18.

Line pressure is also supplied from the conduit 139 to the servo orifice control valve 109 through the port 366, the groove 373, the port 367, and the conduit 141 to the release cavity 153 of the servomotor 152 for operating the front brake 19. The servo orifice control valve piston 362 is moved to the left for this condition by a combined force due to throttle pressure and governor pressure.

Movement of the 2–3 shift valve piston 332 to the limit of its motion to the right causes the land 350 to block the port 341, and also causes the plug 333 to block the port 345. Blocking the port 341 removes the force due to throttle pressure acting on the differential area of lands 350 and 351, and blocking the port 345 prevents the admission of shift valve plug pressure into the bore 331. Movement of the valve piston 332 to the right also removes the force due to line pressure acting on the differential area of lands 349 and 350. Therefore, the speed at which a downshift will occur must be substantially less than that at which an upshift occurs.

A normal downshift from high speed forward drive or direct drive to intermediate speed forward drive occurs when the governor pressure drops to a value sufficiently low to permit the springs 334 and 335 and throttle pressure acting against the shift valve plug 333 to force the piston 332 to the left, to its downshifted position. As the shift valve piston 332 moves to the left sufficiently to open ports 339 and 340, the admission of line pressure and throttle pressure in the respective ports insures that the valve piston 332 moves rapidly to the left.

When the 2–3 shift valve piston 332 moves to the left, line pressure to the conduit 139 is cut off by the land 349 and accumulated fluid within the clutch apply cavity 57 is permitted to drain through the conduit 139, the port 338, the groove 354, the port 337, conduit 133, port 170 of manual valve 100, groove 178 and port 171 into the sump 116. The release cavity 153 of the servomotor 152 is simultaneously drained through the conduit 141, port 367 of control valve 109, groove 373, and port 366 into the conduit 139, from which it is drained along with fluid from the rear clutch apply cavity 57.

Subsequently, a normal downshift from intermediate speed forward drive to the low speed forward drive occurs when the governor pressure drops to a still lower value and the pistons 292 and 293 are moved to the left under the influence of spring 294.

With the piston 292 in its downshifted position, line pressure to the conduit 137 is cut off by the land 310 and accumulated fluid within the apply cavity 151 of the servomotor 152 for the brake 19 is permitted to drain from the conduit 137 through port 299, groove 313, port 298, and conduit 133 through ports 170 and 171.

A forced downshift from direct forward drive to intermediate speed forward drive, that is a kickdown from third to second, is obtained by depression of the accelerator pedal 243 to its limit. Depressing the accelerator pedal 243 downwardly to its limit forces the downshift valve piston 223 to the right until the land 241 uncovers the port 228. In this position, fluid under throttle pressure is permitted to flow from the conduit 126 through the port 228, the groove 242, and the port 227 into the conduit 134. The pressure in the conduit 134 is full throttle pressure and is supplied to the 2–3 shift valve through the port 344 to the bore 331, where it augments the action of the springs 334 and 335 in forcing the piston 332 to the left into the downshift position.

A forced downshift from intermediate to first or low speed forward drive is obtained when throttle pressure in the conduit 134 passes through port 304, groove 318, port 303, and channel 320 to the right end of the 1–2 shift valve piston 293. Throttle pressure acting against the right-hand end of piston 293 augments the action of the spring 294 in forcing the pistons 293 and 292 to the left. Prior to downshifting, the throttle pressure present in the groove 319 develops a force due to the differential in area between lands 316 and 317. This force provides a lag or hysteresis between the points at which a forced downshift occurs and the point at which a forced upshift would occur.

A forced upshift from either low speed forward drive to intermediate speed forward drive or from intermediate speed forward drive to high occurs when the governor pressure is sufficiently great to overcome the combined forces inhibiting an upshift.

The servo orifice control valve 109 functions to soften the engagement of the front brake 19 in downshifting from direct drive to intermediate speed drive. Softening of the engagement of the brake 19 is obtained by slowly draining the fluid from the servo release cavity 153 of the servomotor 152 for the brake 19 through the conduit 141, restriction 140, and into conduit 139. By contrasts, during forced downshift, the servo release cavity 153 should be drained rapidly. For this condition, throttle pressure acting against the right-hand end of the piston 362 forces it to the left against the spring 363 and permits rapid drainage from the conduit 141 through the port 367, the groove 373, and port 366 into the conduit 139. This ensures that the fluid release cavity 153 for the brake 19 may be drained quickly and the brake 19 applied promptly for a kickdown or passing condition.

The servo orifice control valve 109 also functions to permit rapid filling of the servo release cavity 153 for the brake 19 for shifting from intermediate to direct drive under conditions where the throttle has been depressed while the vehicle accelerates and is suddenly released for permitting upshift. With the throttle depressed, throttle pressure ordinarily would force the piston 362 to the limit of its motion to the left so that fluid could flow freely between ports 366 and 367. If this pressure is suddenly removed by lifting the accelerator pedal 243, the valve piston 362 returns to the position shown blocking the flow between ports 366 and 367 and requiring that all of the fluid pass through the restriction 140. This slows the disengagement of brake 19 while the rear clutch 18 was being engaged. To ensure the free flow of fluid between ports 366 and 367 under the above-described condition, governor pressure is supplied through port 365 to the groove 372 between lands 369 and 370. The force due to governor pressure acting on the differential areas of lands 369 and 370 forces the piston 362 to the left in the same manner that throttle pressure does. The servo orifice control valve 109 thereby facilitates smooth engagement and disengagement of the brake 19 under various operating conditions.

An alternate forward drive condition is obtained by moving the manual selector valve 100 into the D2 position. In this position the land 172 of the piston 162 blocks the port 163 and line pressure supplied from the conduit 121 through the port 167 passes through the groove 176 and port 164 into the conduit 129. Line pressure in the conduit 129 is applied through the port 386 to the right end of the D1–D2 control valve piston 382. The force due to line pressure forces the piston to the left opening the port 385. Fluid line pressure is permitted to pass through the port 385, conduit 135, and through port 295 where it acts against the left-hand end of the 1–2 shift valve piston 292. The force due to line pressure is sufficient to move the valve piston 292 into its upshifted position, and it is maintained in this latter position until the selector valve 100 is moved to a different position. With the selector valve 100 in the D2 position, the vehicle starts in intermediate speed ratio and subsequently upshifts to direct forward drive. Low speed forward drive is completely omitted.

A low range operating condition is obtained by shifting the manual selector valve 100 into the "L" position. In this position, line pressure in conduit 121 is supplied through port 168, groove 177, and port 169 into conduit 132 to ports 296 and 301 of the 1–2 shift valve 107. When the shift valve piston 292 is in its downshifted position, fluid pressure is supplied to the port 301 from conduit 132 where it acts against the right-hand end of the valve piston 292 for preventing movement to the right. Fluid is also permitted to pass from conduit 132 through port 296, through the groove 312 and port 297 into the conduit 136 for filling the rear brake supply cavity 150 and engaging the rear brake 20. Fluid under pressure in the 312 develops a net force due to the differential in area between lands 308 and 309 that tends to prevent shifting of the piston 292 into its upshifted position.

When the vehicle is in motion at the time of moving the selector valve to the "L" position and the 1–2 shift valve piston 292 into its upshifted position, the port 296 is blocked by the land 308 thereby preventing application of the rear brake 20. Fluid pressure supplied to port 301 acts against the land 310 tending to force the valve piston 292 into its downshifted position, and when this force exceeds the force due to governor pressure acting on the left-hand end of the land 308, the piston 292 is moved into its downshifted position. Once the piston 292 has downshifted, no amount of governor pressure will be sufficient to cause a subsequent upshift because of the differential forces previously described.

If the manual selector valve 100 is moved into its "L" position while the vehicle is in motion and the 2–3 shift valve is upshifted, the rear clutch apply cavity 57 and the front servo release cavity 153 are permitted to drain through the conduit 139, port 338, groove 354, port 339, conduit 130, and the ports 165 and 163 on the manual valve 100, thereby releasing the rear clutch 18 and causing a prompt downshift to intermediate speed drive.

Reverse drive condition is obtained by moving the manual selector valve 100 into the "R" position. In this position, the land 175 of the piston 162 blocks the port 171, and line pressure is supplied from conduit 121 through port 168 to the ports 169 and 170. Fluid under line pressure is permitted to flow from the port 168 through the groove 178, the port 169 into conduit 132 and to the 1–2 shift valve 107. Line pressure from the conduit 132 enters the bore 291 through the port 301 and acts against the left-hand end of the shift valve piston 292 tending to move it to the left. Line pressure is also admitted through the port 296 where it flows through the groove 312, through port 297, and conduit 136 to the servomotor 150 for applying the rear brake 20.

Line pressure fluid supplied to the selector valve 100 is also permitted to flow from the port 168 through the groove 178, port 170, and conduit 133 to port 337 of the 2–3 shift valve 108 and to the port 298 of the 1–2 shift valve 107. Fluid under line pressure flows from the port 337 through the groove 354, port 338, and conduit 139 into the rear clutch apply cavity 57. Line pressure fluid also flows from the conduit 139 to the servo orifice control valve 109 through port 366, groove 373, port 367, and conduit 141 to the release cavity 153 of the servomotor 152 for the front brake 19.

Line pressure fluid supplied to the 1–2 shift valve 107 flows through the port 298, groove 313, port 299, and conduit 137 to the fluid apply cavity 151 of the servomotor 152 for the brake 19. The servomotor 152 is balanced by line pressure in both the supply and release cavities 151 and 153 and, therefore, remains a disengaged condition. With the manual selector valve 100 in the "R" position the conduit 131 and port 166 are open to the sump 116 through the port 163. Therefore, any fluid accumulated within the clutch apply cavity 48 of the front clutch 17 is permitted to drain through the conduit 161, port 166, groove 176 and port 163 into the sump 116.

The transmission mechanism is thus conditioned for reverse drive by engagement of the rear clutch 18 and engagement of the rear brake 20. The front clutch 17 and front brake 19 remain disengaged. Since the conduit 131 is drained for this condition, there is no fluid pressure supplied to the governor valve 106; consequently there is no governor pressure supplied to any of the shift valves tending to change the driving conditions established.

Referring to FIGS. 5A–5C, there is illustrated a modification of the control system illustrated in FIGS. 4A–4C.

The modified control system comprises:

500 Manual selector valve
501 Primary regulator valve
502 Secondary regulator valve
503 Throttle valve
504 Downshift valve
505 Modulator valve
106 Governor valve
507 1–2 shift valve
508 2–3 shift valve
509 Servo orifice control valve
510 D1–D2 control valve
511 Front pump check valve
512 Rear pump check valve
513 Converter relief check valve
514 Reverse inhibitor valve
515 Governor feed ball check valve.

Of the above-listed valves, the manual valve 500, the primary regulator valve 501, the secondary regulator valve 502, the modulator valve 505, the governor valve 106, the 1–2 shift valve 507, the 2–3 shift valve 508, the servo orifice control valve 509, the D1–D2 control valve 510, and check valves 511–513 are substantially identical to corresponding valves shown in FIGS. 4A–4C. The throttle valve 503 and the downshift valve 504 are separated in the modified embodiment, as will be hereinafter described, and the reverse inhibitor valve 514 and governor feed ball check valve 515 have been added. The various valves described are interconnected in the same manner and bear corresponding numbers as the system shown in FIGS. 4A–4C, except as hereinafter noted.

The throttle valve 503 comprises a casing 550 formed with a stepped longitudinal cylindrical bore 551, a throttle valve piston 552, and a valve spring 553. The casing 550 is also formed with ports 554, 555, 556, 557, and 558, all opening into the bore 551. The port 555 is connected to a throttle pressure conduit 526; the port 558 is also connected through a restriction 559 to the conduit 526; the port 556 is connected to a line pressure conduit 521; and ports 554 and 557 are bleed ports open to the sump 116.

The throttle valve piston 552 is formed with lands 560 and 561 of equal diameter and a land 562 of reduced diameter. The piston 552 is also formed with annular grooves 563 and 564 between the lands.

The throttle valve 503 is adapted to be controlled by a manifold vacuum responsive servomotor 570. The servomotor 570 comprises a casing 571 in which is mounted a flexible diaphragm 572, a connecting shaft 573 attached to the diaphragm 572, and a spring 574 disposed within the casing 571 and acting against the diaphragm 572. The interior of the casing 571 is connected by means of a conduit 575 to the air-intake manifold of the vehicle engine with which the transmission mechanism is adapted to be used. The connecting rod 573 abuts against the throttle valve piston 552 and is adapted to move it against the action of the spring 553 in response to changes in manifold vacuum.

The downshift valve 504 comprises a casing 580 formed with a longitudinal cylindrical bore 581, a valve piston 582 slidably disposed within the bore 581, and a valve spring 583. The casing 580 is also formed with ports 584, 585, 586, and 587, all opening into the bore 581. The port 586 is connected to a throttle pressure conduit 526; the port 585 is connected to a conduit 534 which leads to the 1–2 shift valve 507 and to the 2–3 shift valve 508; and the ports 584 and 587 are bleed ports open to the sump 116.

The downshift valve piston 582 is formed with lands 588 and 589, and an annular groove 590 between the lands. The valve piston 582 is adapted to be moved longitudinally against the action of the spring 583 by means of an armature 544 of a solenoid 545. The solenoid 545 is adapted to be energized by a switch 546 which is closed by the accelerator pedal 543 when depressed to its downward limit.

The reverse inhibitor valve 514 comprises a casing 600 formed with a longitudinal cylindrical bore 601, a valve piston 602 slidably disposed within the bore 601 and a spring 603. The casing 600 is formed with ports 604, 605, 606, 607, 608, 609, and 610, all opening into the bore 601. The port 604 is connected to a governor pressure conduit 528; the port 606 is connected to a governor feed conduit 531a; port 607 is connected by means of a conduit 533 to the manual selector valve 500; ports 608 and 610 are connected to a conduit 533a; and ports 605 and 609 are bleed ports open to the sump 116. The piston 602 is formed with lands 611, 612, and 613, and annular grooves 614 and 615 between the lands.

The governor feed ball check valve 515 comprises a casing 620 formed with a cavity 621, ports 622, 623, and 624, opening into the cavity 621, and a ball 625 adapted to block the ports 622 and 624 for different operating conditions.

In operation, the throttle valve 503 of the modified control system functions as follows: Line pressure is supplied from the front or rear pumps through the conduit 521 and this pressure is regulated by the primary regulator valve 501 as previously described. Line pressure is blocked at the port 556 by the land 561 until the valve piston 552 is moved by the servomotor 570. With the vehicle engine idling in a closed throttle condition, manifold pressure will be at a minimum and the diaphragm 572 and connecting shaft 573 will be moved to the limit of their motion to the left against the action of the spring 574. The spring 553, in turn, forces the throttle valve piston 552 to the position where the land 561 blocks the port 556.

Opening the throttle valve to the vehicle engine raises the pressure in the air-intake manifold, thereby raising the pressure within the casing 571 of the servomotor 570, and the spring 574 forces the connecting shaft 573 and throttle valve piston 552 to the right opening the port 556. Line pressure fluid flows through the port 556 to groove 563, into the conduit 526 and through the restriction 559 and port 558 into the bore 551 where it augments the action of the spring 553 in forcing the piston 552 to the left tending to close the port 556. The throttle valve piston 552 thereby regulates the fluid pressure supplied to the conduit 526 as a function of manifold pressure.

For some applications, the modified throttle valve 503, in combination with the vacuum servomotor 590, is believed to be superior to the embodiments shown in FIG. 4B. For the modification, the interconnection through the downshift valve 504 is eliminated and the throttle pressure supplied to the conduit 526 is regulated more truly as a function of engine load rather than as a function of accelerator pedal position.

The downshift valve 504 functions as previously described in providing throttle pressure through the conduit 534 to the shift valves 507 and 508 for a forced downshift when the accelerator pedal 543 is depressed downwardly to its limit. In the modified embodiment, however, the downshift valve piston 582 is moved longitudinally to the right against the action of the spring 574 by means of an armature 544 of a solenoid 545. The solenoid 545 is energized through a switch 546 that is actuated by the accelerator pedal 543 when depressed to its maximum position.

The downshift valve 504, therefore, is operable only when the accelerator pedal 543 is depressed to its limit. Any stickiness or erratic behavior of the downshift valve 504 is not reflected in the performance of the throttle valve 503.

The reverse inhibitor valve 514, in combination with the governor feed valve 515, functions to prevent a shift into reverse when the vehicle is moved forwardly above a predetermined speed. The provision of such a reverse inhibitor function is deemed necessary in vehicles provided with a pushbutton gear selecting mechanism. Such a provision is not so critical in installations employing a gear selector lever where the selection pattern is more clearly defined.

The reverse inhibitor valve 514 and valve 515 function as follows:

For a normal reverse drive condition, the manual selector valve 100 is moved to the "R" position and line pressure is supplied from the conduit 521 through the conduit 533 to the reverse inhibitor valve 514. The fluid passes through port 607, groove 615, port 608, and into conduit 533a to the 1–2 shift valve 507 and to the 2–3 shift valve 508. From these two valves fluid pressure is supplied to the rear clutch apply cavity 57 and to the rear brake apply servomotor 150 for establishing reverse drive, as previously described. Fluid pressure is also supplied from the conduit 533a into the bore 601 through the port 610 where it augments the action of the spring 603 in maintaining the valve piston 602 in its illustrated position.

With the manual selector valve 500 in a forward drive position, line pressure is supplied from the conduit 521 through the conduit 531 to port 624 of the check valve 515. For this condition, the ball valve 625 is in a position blocking port 622 and line pressure fluid is permitted to flow through the port 623 and conduit 531b to the inlet port of the governor valve 106. Governor pressure in the conduit 528 is thereby maintained for forcing the valve piston 602 to the right, and it is maintained at its limit to the right until governor pressure decreases with decreasing vehicle speed to a predetermined minimum value. At this minimum speed, the spring 603 forces the valve piston 602 to the left to its illustrated position, and reverse drive condition is established as previously described.

With the reverse inhibitor valve 514 in the illustrated position and the manual selector valve 500 in the reverse or "R" position, governor fluid feed through the conduit 533 is blocked by the land 612, and governor fluid feed through the conduit 531 is drained to sump. There is, therefore, no governor pressure provided to either of the shift valves 507 or 508 tending to change the driving conditions established.

Referring to FIG. 6, an improved governor valve adapted to be used with the control system comprises a casing 710 that is keyed to the output shaft 11, a first valve casing 711 and a second valve casing 712 fixedly attached to the casing 710. The valve casing 711 is formed with a stepped radial bore 713, a valve sleeve 714 slidably disposed within the bore 713, a centrifugal weight 715, a stem 716 attached to the weight 715 and piloted through the valve sleeve 714, a retaining cap 717 attached to the inner end of the stem 716, and a spring 718. The casing 711 is formed with ports 719, 720, 721, and 722, all opening into the bore 713. The valve sleeve 714 is formed with a relatively small land 723, a larger land 724, and an annular groove 725 between the lands. The ports 719 and 720 are connected to a fluid inlet channel 726 and a fluid outlet channel 727, respectively, formed in the casing 711. The ports 721 and 722 are bleed ports open to the sump.

The valve casing 712 is formed with a stepped radial cylindrical bore 730, a valve piston 731 slidably disposed within the bore 730 and a valve spring 732. The valve piston 731 is formed with a relatively small land 733, a large land 734 and an annular groove 735 between the lands. The casing 712 is also formed with ports 736, 737, 738, and 739, a fluid inlet conduit 740, and a fluid outlet conduit 741.

The casing 710 is formed with a fluid inlet channel 750, a fluid bypass channel 751, and a fluid outlet channel 752. The channel 750 is connected with the governor feed line 131 and with the fluid inlet channel 726 of the casing 711. The fluid bypass channel 751 interconnects the fluid outlet channel 727 in the casing 711 with the fluid inlet channel 740 in the casing 712. The fluid outlet channel 741 of casing 712 is connected with the outlet channel 752 in the casing 710 which, in turn, is connected with the governor pressure line 128.

The operation of the improved governor valve 706 may be described by referring to the graph of FIG. 7. Governor fluid feed is supplied from the conduit 131 through channels 750 and 726 to the port 719. When the driven shaft 11 is at rest, the land 723 blocks the port 719. When the driven shaft 11 and valve 706 are set into rotation, centrifugal force acting on the weight 715 forces it outwardly, and this force is transmitted through the stem 716, retaining cap 717 and spring 718 to the valve sleeve 714. The valve sleeve 714 is moved outwardly opening the port 719 and admitting line pressure into the groove 725 between the lands 723 and 724. Since the land 724 is of a greater diameter than the land 723, the force due to pressure acting on the differential area moves the valve sleeve 714 inwardly tending to close the port 719. The valve sleeve 714 thereby provides a regulated output pressure that is a function of and proportional to the rotational or vehicle speed.

The regulated output pressure is illustrated on the graph of FIG. 7 by the curve between points O and A. At some speed of revolution, the retaining cap 717 bottoms out against the casing 711 and any increase in centrifugal force acting on the weight 715 is no longer effective to move the valve sleeve 714.

Centrifugal force acting on the valve sleeve 714 itself continues to provide a regulated output pressure that is a function of speed of revolution. The output pressure for this condition is illustrated between points A and B on the curve. If the retaining cap had not bottomed out against the casing 711, the output pressure would have continued to increase along the dotted line curve between A and D. This two-stage action of the governor valve sleeve 714 extends the range of operation of the valve output to the point B which is a higher speed of revolution than that illustrated at point D.

It is desirable to extend the operating range of the governor pressure to still higher speeds in vehicles having engines adapted to operate at high speeds of revolution. In order to extend this range the additional valve piston 731 is provided which functions as follows:

The spring 732 and centrifugal force act against the valve piston 731 forcing it outwardly so as to provide continuous communication between the ports 736 and 737 for all speeds lower than that illustrated by point B. For these low speeds of revolution, the governor pressure from the valve 714 is supplied through channel 727, bypass channel 751, channel 740, port 736, groove 735, port 737, channel 741, and channel 752 to the governor pressure conduit 128.

In the absence of the additional valve piston 731, the governor output pressures would increase along the curve A, B, E. However, when the pressure reaches that illustrated by the point B, the force due to pressure acting on the differential areas of the lands 733 and 734 is sufficient to move the valve piston 731 radially inward against the centrifugal force and the action of the spring 732, thereby tending to close the port 736. Partially closing the port 736 reduces the pressure in the groove 735 between lands 733 and 734 and permits the valve piston 731 to move outwardly again. Opening of the port 736 permits additional fluid to flow into the groove 735 where the force due to differential areas again tends to close port 736. The valve piston 731 thereby functions to regulate the output pressure supplied through channels 741 and 752 at a lower value than would be obtained in the absence of valve piston 731. The pressure developed in this operating range is illustrated on the curve between points B and C.

The line defined by the points D, E and C is line pressure, and it is apparent that the effective operating range, that is, before governor pressure reaches line pressure, has been extended from the speed of revolution represented by the point E to the point represented by the point C.

There has been provided by the present invention an improved control system effective to control a multi-speed ratio transmission mechanism precisely and with a minimum of shock or lurch in shifting from one gear ratio to another. The transmission controls illustrated have been simplified so as to remove tolerance restrictions without sacrificing performance characteristics. By minimizing the tolerance requirements in the various valves and valve elements, the system has been adapted to economical mass production methods of manufacture.

It is to be understood that the invention is not to be limited to the specific constructions and arrangements shown and described, except only insofar as the claims may be so limited, as it will be understood to those skilled in the art that changes may be made without departing from the principles of the invention.

I claim:

1. In a transmission mechanism for an automotive vehicle having an engine and a throttle and throttle actuator for controlling the engine, the combination of a drive shaft, a driven shaft, means including a fluid pressure actuated fluid servomotor for completing a power train betwen said shafts, a fluid source connected to said servomotor for supplying fluid under pressure to said servomotor, a regulator valve including a valve piston having two ends for regulating the fluid pressure from said source, a throttle valve connected to the throttle actuator and supplied with fluid from said source for providing a fluid pressure responsive to the operative position of the throttle actuator and supplying this pressure to one end of said regulator valve for thereby regulating the output pressure from said source as a function of throttle actuator position, and modulator valve means for modulating the fluid pressure supplied from said throttle valve and applying the modulated output pressure to the other end of said regulator valve for thereby regulating the output pressure from said source as a function of throttle actuator position and a modified function of throttle actuator position.

2. In a transmission mechanism for an automtotive vehicle having an engine and a throttle and throttle actuator for controlling the engine, the combination of a drive shaft, a driven shaft, means including a fluid pressure actuated servomotor for completing a power train between said shafts, a fluid source connected to said servomotor for supplying fluid under pressure to said servomotor, a regulator valve including a valve piston having two ends for regulating the fluid pressure from said source, a throttle pressure valve supplied with fluid from said source and connected to the throttle actuator for providing fluid pressure responsive to the operative position of the throttle actuator and supplying said throttle pressure to one end of the regulator valve, a modulator valve for modulating said throttle pressure and supplying said modulated pressure to the other end of said regulator valve, and a governor valve supplied with fluid from said source and connected to be driven by said driven shaft for providing a fluid pressure responsive to the speed of the vehicle and supplying said speed responsive pressure to said modulator valve to position said modulator valve at a predetermined speed of the vehicle to admit throttle pressure to both ends of said regulator valve.

3. In a transmission mechanism for an automotive vehicle having an engine with an air-intake manifold and a throttle for controlling the engine, the combination of a drive shaft, a driven shaft, means including a fluid pressure actuated servomotor for completing a power train between said shafts, a fluid source connected to said servomotor for supplying fluid under pressure to said servomotor, a regulator valve for regulating the fluid pressure supplied from said source, a manifold air pressure responsive valve connected to the air-intake manifold and supplied with fluid from said source for providing a fluid pressure to said regulator valve that is a function of manifold air pressure, a modulator valve for modulating the fluid pressure supplied from the manifold responsive valve and for applying the modulated pressure to said regulator valve, and vehicle speed responsive means to position said modulator valve at a predetermined speed of the vehicle to admit additional manifold responsive pressure directly to said regulator valve.

4. In a transmission mechanism for an automotive vehicle having an engine with an air-intake manifold and a throttle for controlling the engine, the combination of a drive shaft, a driven shaft, means including a fluid pressure actuated servomotor for completing a power train between said shafts, a fluid source connected to said servomotor for supplying fluid under pressure to said servomotor, a regulator valve including a valve piston having two ends for regulating the fluid pressure supplied from said source, a second valve supplied with fluid from said source for providing an output pressure to one end of the regulator valve, a manifold vacuum responsive servomotor connected to the air-intake manifold and to said second valve for regulating the output pressure as a function of manifold vacuum, a third valve for modulating the output pressure from said second valve and applying the modulated pressure to the other end of said regulator valve, and a governor valve supplied with fluid from said source and connected to be driven by said driven shaft for providing a fluid output pressure responsive to vehicle speed and applying said governor pressure to said third valve for positioning said third valve at a predetermined speed of the vehicle to admit speed of the vehicle and thereby admitting output pressure from said second valve directly to the other end of said regulator valve.

5. In a transmission mechanism for an automtotive vehicle having a throttle and throttle actuator, the combination of a drive shaft, a driven shaft, means for providing a low speed power train between said shafts including a first fluid pressure actuated servomotor for rendering the power train effective, means for providing a high speed power train between said shafts including a second fluid pressure actuated servomotor for completing the power train, a source of fluid pressure for operating said servomotors, shift valve means connected to said source for directing fluid from said source to one or the other of said servomotors, conduit means interconnecting said shift valve means with said servomotors for delivering the fluid, means defining a fluid flow restriction in said conduit means for limiting the rate of application of fluid pressure to one of said servomotors, control valve means interconnected with said conduit means for rendering ineffective said restriction and thereby increasing the rate of application of fluid pressure to one of said servomotors, and means responsive to the operative position of the throttle actuator for actuating said control valve means for thereby controlling the rate of shift from one power train to the other in accordance with throttle actuator position.

6. In a transmission mechanism for an automotive vehicle having a throttle and throttle actuator, the combination of a drive shaft, a driven shaft, means for providing a low speed power train between said shafts including a first fluid pressure actuated servomotor for rendering the power train effective, means for providing a high speed power train between said shafts including a second fluid pressure actuated servomotor for completing the power train, a source of fluid pressure for operating said servomotors, shift valve means for directing fluid from said source to one or the other of said servomotors, conduit means for delivering fluid from said shift valve means to said servomotors, means defining a fluid flow restriction in said conduit means for limiting the rate of application of fluid pressure to one of said servomotors, control valve means interconnected with said conduit means for rendering ineffective said restriction and thereby increasing the rate of application of fluid pressure to one of said servomotors, means responsive to the operative position of the throttle actuator for actuating said control valve means, and means responsive to the speed of the vehicle for also actuating the control valve means for thereby controlling the shift from one power train to another in accordane with variations in vehicle speed and throttle actuator positions.

7. In a transmission mechanism for an automotive vehicle having an engine and a throttle and throttle actuator for controlling the engine, the combination of a drive shaft, a driven shaft, means for providing a low speed power train between said shafts including a first fluid pressure actuated servomotor for rendering the power train effective, means for providing a high speed power train including a second fluid pressure actuated servomotor for completing the power train, a fluid source for providing fluid under pressure for operating said servomotors, a shift valve for directing fluid from said source to one or the other of said servomotors, conduit means for delivering fluid from said shift valve to said servomotors, means defining a fluid flow restriction in said conduit means for limiting the rate of application of fluid pressure to one of said servomotors, a control valve interconnected in said conduit means and operable to bypass said restriction and thereby increase the rate of application of fluid pressure to one of said servomotors, a throttle valve supplied with fluid from said source and connected to the throttle actuator for providing a throttle responsive pressure to said control valve for actuating it, and a governor valve connected to said source and to said driven shaft for providing a vehicle speed responsive pressure that is also applied to said control valve for actuating it, said control valve thereby being effective to bypass said restriction under conditions of high vehicle speed and throttle actuator positions corresponding to substantially open throttle.

8. In a fluid control system for an automatic transmission having a drive shaft and a driven shaft and a source of fluid pressure, a governor valve connected to be driven by said driven shaft and comprising a first casing formed with a stepped radial bore therein, a first valve piston slidably disposed within said bore and formed with a relatively small land and a relatively large land, a centrifugal weight attached to and adapted to exert a centrifugal force upon said valve piston in accordance with the speed of rotation of the driven shaft, means defining an inlet port formed in said casing and connected to the source for providing fluid to said bore, means defining an outlet port formed in said casing and adapted to be restricted by one of said lands for providing a fluid output pressure that increases in proportion to increasing speed of the driven shaft, a second casing formed with a stepped radial cylindrical bore therein, a second valve piston slidably disposed wthin said bore and formed with a relatively small land and a relatively large land and adapted to be moved radially outwardly under the influence of centrifugal force, means defining a second inlet port connected to said outlet port for admitting the fluid output pressure from said first valve piston into said bore, means defining a second fluid outlet port for releasing fluid from said bore and supplying it to the fluid control system, and spring means acting on said second valve piston for permitting the free passage of fluid between said second inlet and outlet ports below a predetermined speed of the driven shaft, and said second valve piston being effective to regulate the output pressure from said first valve as a function of increasing vehicle speed above said predetermined speed.

9. In a transmission mechanism for an automotive vehicle having an engine and a throttle and throttle actuator for controlling the engine, the combination of a drive shaft, a driven shaft, means for providing a low speed power train between said shafts including a first fluid pressure actuated servomotor, means for providing a high speed power train betwen said shafts including a second fluid pressure actuated servomotor, a source of fluid pressure for supplying fluid to said servomotors, shift valve means for directing fluid from said source to one or the other of said servomotors, conduit means for delivering fluid from said shift valve means to said servomotors, means defining a fluid flow restriction in said conduit means for limiting the rate of application of fluid pressure to one of said servomotors, control valve means interconnected with said conduit means for bypassing said restriction and thereby increasing the rate of application of fluid pressure to said one servomotor, and governor valve means supplied with fluid from said source and connected to be driven by said driven shaft for providing a fluid pressure that increases with increasing vehicle speed and applying this pressure to said control valve for actuating it and thereby bypassing said restriction under conditions of high vehicle speed.

10. In a transmission mechanism for an automotive vehicle having an engine and a throttle actuator for controlling the engine, the combination of a drive shaft, a driven shaft, means including a fluid pressure actuated servomotor for completing a power train between said shafts, a fluid source connected to said servomotor for supplying fluid under pressure to said servomotor, first valve means in communication with said source for regulating the fluid pressure supplied from said source to said servomotor, said first valve means including two lands, second valve means connected to the throttle actuator and to said source, said second valve means connected to said first valve means and operable to provide a fluid pressure to one of said lands which is responsive to the position of the throttle actuator thereby urging said valve to a position at which the fluid pressure regulated by said first valve means is increased, third valve means in communication with said second valve means and said first valve means operable to supply fluid pressure received from said second valve means to the other of said lands on said first valve means which is less than the fluid pressure supplied to said one land thereby urging said first valve means to a position at which the fluid pressure regulated by said first valve is decreased, and means responsive to a predetermined speed of the vehicle for positioning said third valve means to allow the fluid pressure applied to said other land to substantially equal the fluid pressure applied to said one land.

References Cited in the file of this patent

UNITED STATES PATENTS 2,950,629     Holdeman et al. _____ Aug. 30, 1960